United States Patent [19]
Baldwin et al.

[11] Patent Number: 5,329,604
[45] Date of Patent: Jul. 12, 1994

[54] OPTICAL FIBER COUPLING DEVICE AND OPTOELECTRONIC SYSTEM UTILIZING SAME

[75] Inventors: Clark F. Baldwin, Vestal; David B. Howe; Thomas B. Kellerman, both of Binghamton, all of N.Y.

[73] Assignee: International Business Machines Corporation, Armonk, N.Y.

[21] Appl. No.: 16,368

[22] Filed: Feb. 11, 1993

[51] Int. Cl.⁵ .......................... G02B 6/00; G02B 6/36
[52] U.S. Cl. ..................................................... 385/92
[58] Field of Search .................... 385/88–93, 385/69, 70, 72

[56] References Cited

U.S. PATENT DOCUMENTS

| | | | |
|---|---|---|---|
| 4,762,388 | 8/1988 | Tanaka et al. | 350/96.20 |
| 4,953,929 | 9/1990 | Basista et al. | 350/96.20 |
| 4,979,792 | 12/1990 | Weber et al. | 350/96.20 |
| 5,005,939 | 4/1991 | Arvanitakis et al. | 350/96.20 |
| 5,011,246 | 4/1991 | Corradetti et al. | 385/92 |
| 5,016,968 | 5/1991 | Hammond et al. | 350/96.20 |
| 5,073,045 | 12/1991 | Abendschein | 385/90 |
| 5,073,046 | 12/1991 | Edwards et al. | 385/92 X |
| 5,073,046 | 12/1991 | Edwards et al. | 385/90 |
| 5,091,991 | 2/1992 | Briggs et al. | 385/82 |
| 5,109,453 | 4/1992 | Edwards et al. | 385/90 |
| 5,149,663 | 8/1992 | Edwards et al. | 385/90 |

FOREIGN PATENT DOCUMENTS 207106  3/1984  Japan .............................. G02B 6/36

*Primary Examiner*—Akm E. Ullah
*Attorney, Agent, or Firm*—Lawrence R. Fraley

[57] ABSTRACT

An optoelectronic system including an optoelectronic assembly for receiving and/or transmitting optical data signals, optic means for being optically coupled to the optoelectronic assembly, and an optical fiber coupling device for coupling the optic means and at least one of the optoelectronic devices which form part of the assembly. The coupling device includes a housing for being positioned adjacent the assembly relative to the optoelectronic device and, significantly, latching means movably positioned within the housing for initially engaging the optoelectronic device and thereafter for engaging the incoming optic means (e.g., optical fiber connector) when the optic means is positioned within the coupling device's housing. Keying and shutter means are also provided as part of the coupling device.

25 Claims, 3 Drawing Sheets

OPTICAL FIBER COUPLING DEVICE AND OPTOELECTRONIC SYSTEM UTILIZING SAME

This invention relates to optical fiber coupling devices for use with optoelectronic assemblies and associated components, such as duplex optical fiber connectors, which in turn may form part of an optoelectronic system of an information handling system (computer) or the like.

CROSS REFERENCE TO COPENDING APPLICATION

In Ser. No. (S.N.) 07/874,162 now being allowed, entitled "Optical Fiber Duplex Connector Assembly" (C. F. Baldwin et al), filed Apr. 27, 1992, there is defined an optical fiber connector wherein two individual connectors (such as those of the SC variety as mentioned below) are housed in movable orientation. The optical fiber coupling device as defined in the present application is adapted for receiving therein this connector as well as others known in the art.

BACKGROUND OF THE INVENTION

As is known, the use of optical fiber as a transmission media is growing at an accelerating rate, including within the information handling system (computer) industry. The advantages of optical fibers over other forms of transmission media are well known. The potential bandwidth (or message carrying capacity) of optical fibers is extremely high. Systems using optical fibers are resistant to electro-magnetic interference which sometimes plagues systems having electrical cables. In addition, optical fiber cabling offers a higher degree of data security than such electrical cables, as it is more difficult for unauthorized personnel to tap or access an optical fiber cable without being detected.

Optical fiber devices use single or multiple strands of fibers each having an inner circular glass core coated with an circumferential cladding having a different index of refraction. Light is transmitted along the core and totally reflected from the interface between the core and cladding. Such devices can be used as transmission lines for transmitting and/or receiving, information bearing light energy.

Typically, transmission lines terminate in optical fiber connectors, such as those referred to in the industry as SC connectors, each of which include as part thereof an outer housing wherein there is positioned the terminating end of the optical fiber. This terminating end is fixed within a ferrule, typically of ceramic material, the ferrule being resiliently oriented such that is can be slightly compressed when the connector is located within a receiving module assembly or the like. Such connectors are illustrated and described in U.S. Pat. No. 4,953,929, and in the aforementioned copending application Ser. No. 07/874,162, both of which are incorporated herein by reference. Attention is also particularly directed to U.S. Pat. No. 5,005,939, wherein an optoelectronic assembly designed to receive a duplex optical fiber connector is defined in detail, said patent also incorporated herein by reference. By the term module as used herein is meant to include an assembly as defined in 5,005,939, while the term connector is meant to include those such as the aforementioned SC type (including when same are retained in a suitable, accommodating adapter as defined in 4,953,929) as well as those of the duplex variety wherein two optical fiber terminal ends (and ferrules) are retained within a singular, common housing (one such example illustrated and described in 5,005,939).

There presently exist in the industry various coupling devices which are designed for coupling in an end-to-end orientation optoelectronic assemblies or modules with associated optical fiber connectors. Due to manufacturing tolerances, however, precision alignment between such structures is often difficult. The connector assembly as defined in Ser. No. 07/874,162 is designed to overcome many such tolerance problems, primarily when attempting to mate two individual SC-type connectors with a singular module, by enabling a degree of flexibility of movement of various parts during connector insertion within a receiving coupling device (shroud). Similarly, the adapter defined in 4,953,929 enables relative movement of the two contained connectors during such insertion. Clearly, both of these structures overcome many of the tolerance problems associated with rigidly fixed embodiments such as known duplex connectors having a singular housing with two encased ferrules.

As defined herein, the present invention provides a new and unique coupling device for optically coupling an optoelectronic module (or assembly) with a mating optical fiber connector such that precision alignment between the connector's optical ferrule(s) and the optoelectronic device (s) retained within the module is attained. Such optoelectronic devices are also often referred to in the industry as optical transceivers, functioning in the manner described in detail in 5,005,939. As understood, the coupling device of the invention is able to substitute for the structure referred to in 5,005,939 as a shroud, and thus may also be referred to as such a component. The invention is of course not to be limited to such usage, as the invention may be used in any situation requiring coupling between such structures as cited above.

One particular application for the invention is as part of what is referred to in the industry as an F.D.D.I. assembly, F.D.D.I. standing for Fiber Distributed Data Interface, and constituting a standard adopted in the industry and approved by the American National Standards Institute (A.N.S.I.). This standard defines the critical requirements for various optoelectronic components, including connectors and modules, which will form part of a high speed optic network. As understood from the following, the invention is able to satisfactorily meet such critical requirements, while assuring a product which is of relatively simple construction and which is also relatively inexpensive to manufacture and purchase. Further, the invention is able to overcome many of the tolerance problems mentioned above by the provision of a structure which is able to accommodate relative movement of the module's optoelectronic devices in addition to movement by the incoming optical fiber connector ends, while, surprisingly, still assuring precision alignment between such components.

It is believed that such a coupling device, particularly one suited especially for utilization within an information handling system, would represent a significant advancement in the art.

DISCLOSURE OF THE INVENTION

It is a primary object of the present invention to enhance the optoelectronic art, and particularly that portion of the art involved with optical coupling.

It is a more particular object of the invention to provide an optical fiber coupling device wherein individual optical fiber connectors are permitted relative freedom of movement to enable such connectors to be optimally aligned with optoelectronic devices of an optoelectronic module.

It is yet another object of the invention to provide such a coupling device which also accommodates for manufacturing tolerances of the various components (connectors and module) being coupled, while assuring the precision alignment therebetween demanded in today's optoelectronic environment.

It is a further object of the invention to provide such an assembly which is relatively easy to operate, of relatively simple construction, and which can be produced in a relatively inexpensive manner.

In accordance with one aspect of the invention, there is provided an optical fiber coupling device which serves to couple at least one optoelectronic device of an optoelectronic assembly with an optic means (e.g., at least one optical fiber connector), the device comprising a housing adapted for being located relative to the optoelectronic assembly (so as to be positioned relative to the optoelectronic device) and defining a chamber therein. The chamber is adapted for accommodating the optic means therein. The device further comprises a latching means positioned within the housing and adapted for engaging the optoelectronic device (e.g., by having an end of the device inserted therein) initially and thereafter adapted for engaging the optic means when the optic means is positioned within the housing's chamber. In this initial engagement, the latching means is capable of assuming a relatively fixed orientation within the housing, while in the second engagement (with the optic means), the latching means also serves to retain the optic means within the housing's chamber.

In accordance with another aspect of the invention, there is provided an optoelectronic system for use in an information handling system wherein the optoelectronic system comprises an optoelectronic assembly, an optic means for being optically coupled to the optoelectronic assembly, and an optical fiber coupling device of the nature defined hereinabove for coupling the optic means and the optoelectronic assembly.

BRIEF DESCRIPTION OF THE DRAWINGS

FIG. 1 is a front perspective view, in exploded format, illustrating an optical fiber coupling device in accordance with a preferred embodiment of the invention, the device being located intermediate an optical fiber connector and an optoelectronic module, the module shown mounted on a printed circuit board or the like;

BEST MODE FOR CARRYING OUT THE INVENTION

For a better understanding of the present invention, together with other and further objects, advantages and capabilities thereof, reference is directed to the following disclosure and appended claims, in connection with the described drawings.

In the description provided below, similar numbers will be used in different figures to illustrate similar elements.

Figure 1:
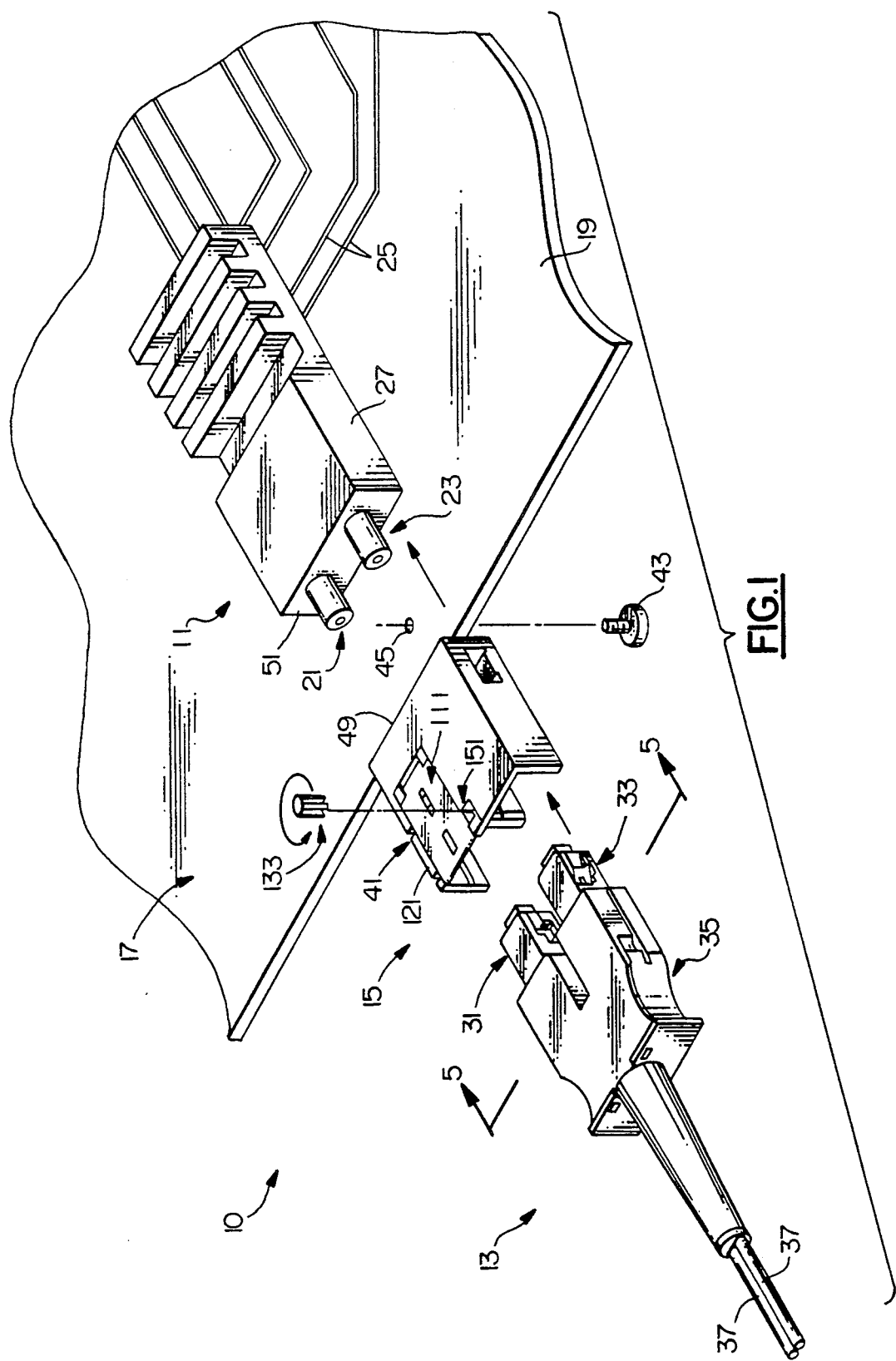

In FIG. 1, there is shown an optoelectronic system 10 for use in an information handling system (computer) in accordance with the preferred embodiment of the invention. System 10 includes an optoelectronic assembly 11, optic means 13, and an optical fiber coupling device 15 which, as defined, optically couples assembly 11 and means 13.

In a preferred embodiment of the invention, assembly 11 is similar to that assembly defined in U.S. Pat. No. 5,005,939, the disclosure of which is incorporated herein by reference. As defined therein, assembly 11 is particularly adapted for providing bidirectional data transmission between fiber optic means (e.g., 13) and an electrical circuit member 17 which, in a preferred embodiment of the invention, comprises a printed circuit board 19 which forms part of the electrical circuitry of the computer which uses system 10. Located within assembly 11 is a pair of optoelectronic devices 21 and 23 which are adapted for functioning in the manner defined in 5,005,939. Specifically, one of these is adapted for receiving optical data signals (from optic means 13) and for converting these to electrical data signals, which signals are then transmitted through circuit lines (e.g., 25) to the other parts of the overall computer system. Additionally, the other of these optoelectronic devices is designed for receiving electrical data signals from the computer system (including, for example, along other electrical lines 25) and for converting these to optical data signals for passage out through optic means 13. The preferred embodiments for the devices which function in the manner defined above are described in detail in 5,005,939 and further description is not believed necessary.

Significantly, each of the optoelectronic devices 21 and 23 protrudes a predetermined distance from one of the sides of the assembly's housing 27. Each protruding end of one of these devices, understandably, must be precisely aligned with a respective component of optic means 13. Such alignment is understandably critical in order for optimal transmission between these respective components.

In accordance with a preferred embodiment of the invention, optic means 13 comprises a pair of singular optical fiber connectors 31 and 33 which are movably positioned, uniquely, within a common housing 35 in the manner specifically defined in Ser. No. 07/874 162 now allowed, the teachings of which are also incorporated herein by reference. Generally, these two optical fiber connectors preferably represent connectors similar to those referred to in the art as SC connectors, currently available on the marketplace. Such SC connectors are preferably retained in the optic means (housing 35) and are each particularly adapted for being precisely aligned with a respective one of the optoelectronic devices 21 and 23. Thus, optical data is transmitted through both of these connectors to and from the optoelectronic assembly 11. Each connector 31 and 33 is also optically connected to a respective cable 37 which protrudes from an opposing end of housing 35 than that of the forward end portion of each connector. Each forward end, as shown, protrudes from the common housing 35 and, as defined in Ser. No. 07/874,162 now allowed, is movably located such that it is capable of being moved, slightly, in several directions during insertion within a suitable coupling device (defined below) or the like. Such movement, as defined in Ser. No. 07/874,162 now allowed, is deemed significant for the reasons stated therein, while assuring tolerance compensation and the several advantages (e.g., reduced cost) associated therewith.

It will be understood that the coupling device of the present invention provides similarly advantageous features, primarily the compensation for manufacturing tolerances, and thus represents yet another enhancement in the art.

Alternatively, it is within the scope of the invention to utilize known duplex optical fiber connectors in place of the connector assembly illustrated in FIG. 1, while still substantially assuring the desired coupling herein. Alternatively, it is even further possible to utilize two individual SC-type optical fiber connectors and individually insert these within designated, accommodating openings within a coupling device such as taught herein. Still further, it is within the scope of the present invention to utilize two such singular optical fiber SC-type connectors, and movably retain these using the unique adapter defined in U.S. Pat. No. 4,953,929, the disclosure of which is incorporated herein by reference. This adapter, like the housing in Ser. No. 07/874,162 now allowed, allows relative movement of the retained optical fiber connectors and thus assures the advantages of such positioning. As described herein, the optoelectronic system 10 is particularly adapted for compliance with the aforementioned F. D. D. I. standard developed by A. N. S. I. Accordingly, the present invention is adaptable for use in many of today's information handling systems while assuring the several highly advantageous features taught herein.

As shown in FIG. 1, system 10 further includes the aforementioned optical fiber coupling device 15 which, as mentioned, optically couples the respective optoelectronic devices (21, 23) of assembly 11 with respective optical fiber connectors (31, 33) of optic means 13. Coupling device 15 includes a housing 41 adapted for being positioned on circuit board 19 immediately adjacent the forward end of the assembly's housing 27. Such positioning is preferably attained using a retention screw 43 which passes through a hole 45 in board 19 and thereafter into another hole 47 located in the under side of housing 41. This accommodating, second hole 47 is not shown in FIG. 1, significantly, because the housing 41 is illustrated in its normal, upright position. For ease of illustration, however, housing 41 will be shown in FIGS. 2, 3 and 4 in an inverted position, thus better illustrating the various internal working elements thereof. Hole 47 is clearly seen in these views.

In FIG. 1, it is understood that a side wall (49) of housing 41 is located immediately adjacent the respective end wall (51) of housing 27 of assembly 11, and more particularly, in abutting relationship thereto. As understood, such positioning occurs prior to positioning of optic means 13 within the coupling device. Once seated on the upper surface of board 19 in such a position (abutting the forward end of assembly 11), retention screw 43 is used to provide final retention. Further description of such positioning is provided below.

Figure 2:
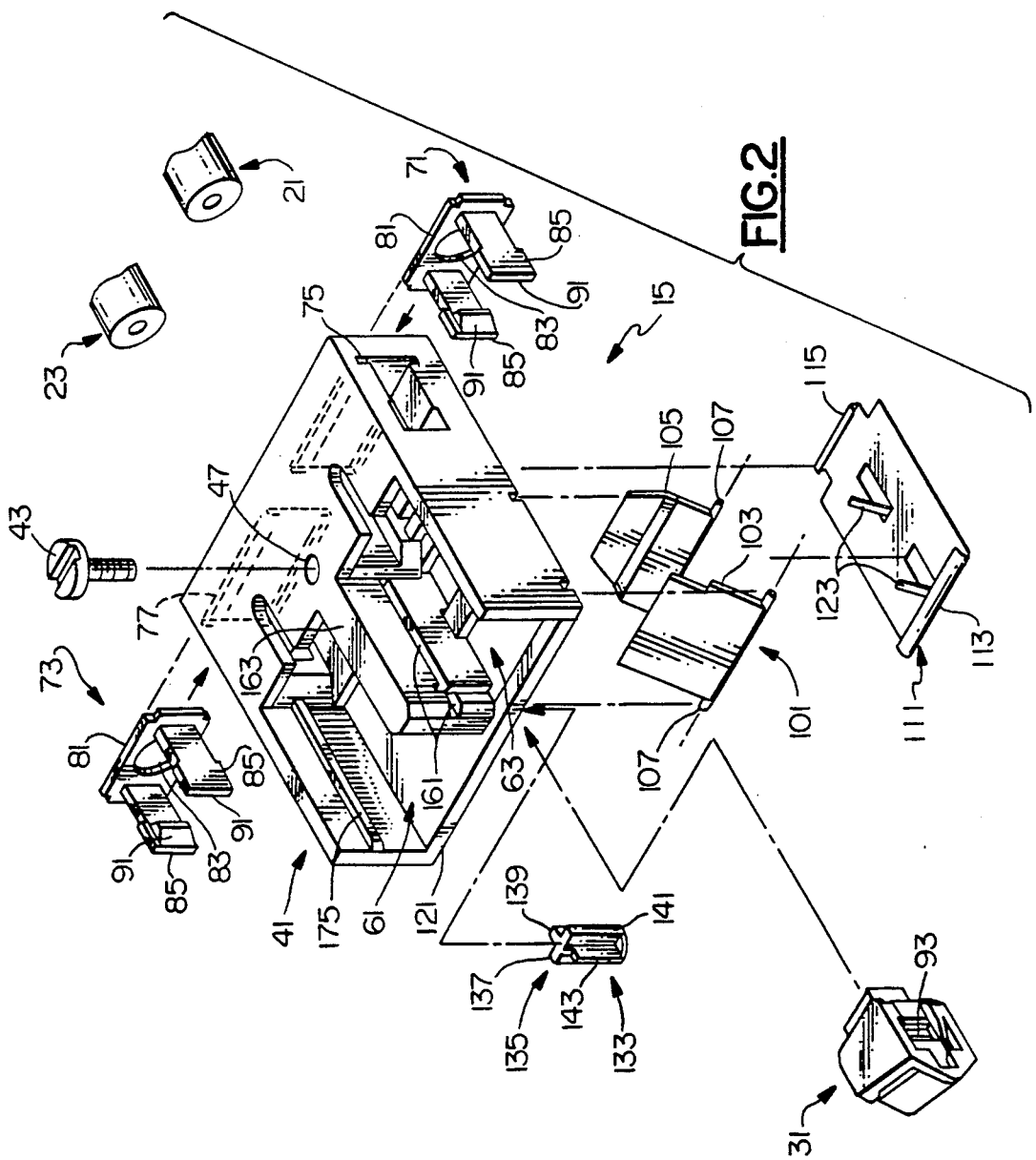
FIG. 2 is an exploded perspective view, on an enlarged scale over the view in FIG. 1, depicting the coupling device of the invention. The device is shown inverted in FIG. 2 in comparison to its position in FIG. 1, for ease of illustration.

In FIG. 2, housing 41 of device 15 is shown in exploded format, thus better illustrating the various internal components thereof. As shown, housing 41 includes a pair of chambers 61 and 63 therein, each chamber designed for receiving the forward end portion of a respective one of the optical fiber connectors 31 or 33. In the embodiment of FIG. 2, with housing 41 shown in an inverted position, chamber 61 is designed for receiving optical fiber connector 33 while chamber 63 receives connector 31.

Although two chambers are described for use in the present invention (primarily to accommodate the alignment with respective pairs of connectors and optoelectronic devices), it is understood that the teachings of the invention are not limited in scope to this particular combination. It is understood that in the broad aspects of the invention, coupling between a singular optoelectronic device and associated optical fiber connector is attainable in the precise manner required, should such a singular paired arrangement be desired. Because most systems today require bidirectional transmission, the teachings of the present invention as provided herewith are particularly adaptable to such an arrangement.

Figure 3:
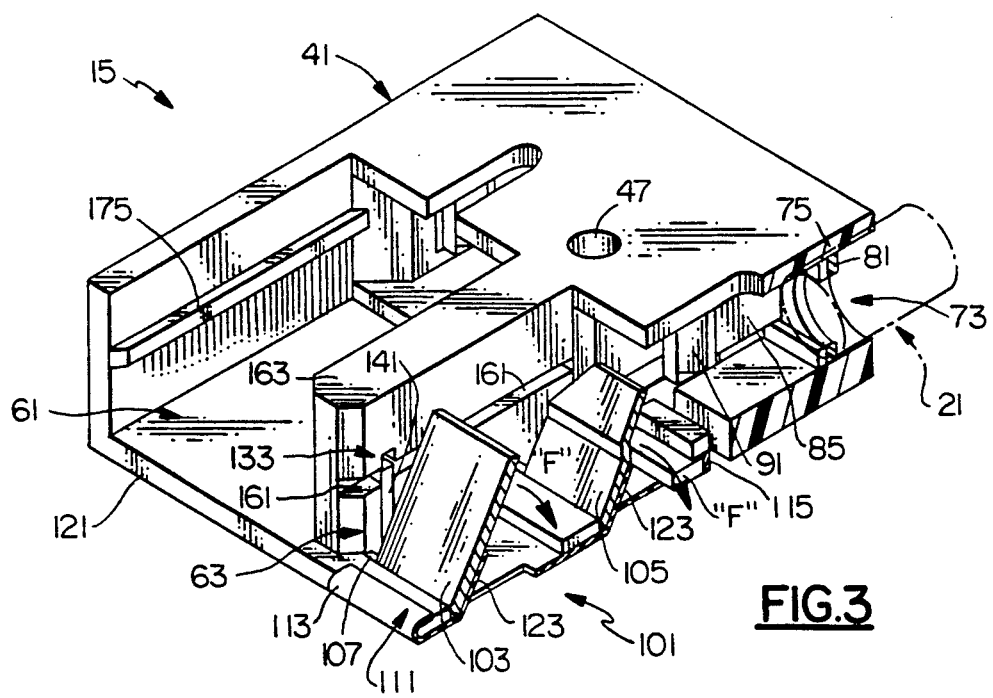
FIG. 3 is a much enlarged, partial perspective view, partly in section, of the coupling device of the invention, and further illustrating the various elements thereof.

Each chamber 61 is substantially rectangular at the optical fiber connector receiving end and thereafter tapers to a narrower, also rectangular internal portion toward that end of housing 41 designed to accommodate devices 21 and 23. In FIG. 3, one such device (21) is shown (in phantom) partially inserted within this narrower, rectangular end of chamber 63. In order to grasp the protruding ends of devices 21 and 23, device 15 includes latching means 71 and 73 which, significantly, are each movably positioned (in a slidable manner) within housing 41 through the provision of elongated slots 75 and 77 (slot 77 shown hidden while part of 75 is exposed). Each latching means includes a main base portion 81 having a central opening 83 therein, which opening 83 is designed for accommodating a respective terminal end (also cylindrical in FIG. 2) of the respective devices 21 and 23. The invention is not limited to the use of cylindrical devices in that the latching means of the invention may readily accommodate other end configurations (e.g., box-like) through the provision of other openings (e.g., rectangular) within the respective base portions. Additionally, each latching means includes a pair of protruding latch arms 85 which project, substantially parallel to one another, from the planar base portion 81 toward the larger, open portion of respective chambers 61 and 63.

Each latch 71 and 73 is initially slidably positioned within the respective receiving slot as shown in FIG. 2 so as to be initially movably positioned therein. Such positioning, understandably, occurs prior to engagement with the respective terminal ends of devices 21 and 23. Once so positioned, housing 41 is moved relative to these devices and the latching means are movably adjustable so as to accommodate a respective terminal end of a device within the central opening (83) thereof. Thus, the latching means of the invention are uniquely able to accommodate for manufacturing tolerances (e.g., spacing) between the two, spaced devices, while still effectively retaining these end portions therein when housing 41 is firmly seated in the described manner.

Each of the latching means, as described, includes the defined, protruding latch arms 85. In final assembly, each pair of such arms (those associated with a respective one of the latching means) is designed for grasping the protruding rectangular housing of a respective one of the optical fiber connectors (31, 33) when these connectors are fully positioned within a respective chamber of device 15. Accordingly, each protruding latch arm includes a latch segment 91 which is designed for being inserted within a corresponding indentation 93 (FIG. 2) formed within the side of one of the connectors. Thus, two opposing sides of each connector include such an indentation, such that each connector is retained on opposite sides thereof to thus form a relatively firm, locking type engagement, yet one which enables withdrawal of these connectors should it be desired to remove optic means 13. Understandably, arms 85 bend slightly (deflect outwardly) to accommodate such withdrawal, provided sufficient force is utilized on each connector.

It is noted that in FIG. 3, only part of one of the invention's latching means (73) is shown for illustration purposes, such that only one of the respective latching arms (85) is provided. The relative positioning of the means' base portion 81 within the respective slot 75 is also better seen in FIG. 3.

It is thus understood that each of the optical fiber connectors 31 and 33 are fully inserted within the respective chambers to the extent that latching by the invention's movable latches occurs, such that the forward end of each optical fiber connector abuts against a respective opposing, forward end of the respective devices 21 and 23. The invention as defined is thus able to accommodate for manufacturing tolerances between the two optoelectronic devices, including particularly the relative spacings therebetween, which spacings may be different from assembly to assembly. It is understood that the precise alignment demanded in this particular environment is intolerant of even minor discrepancies in spacings and other dimensions as might occur during manufacture. Significantly, the present invention overcomes such tolerance difficulties, while still enabling precise alignment between these structures and a respective pair of movable optical fiber connectors.

Once the latching means of the invention have securely engaged the respective optoelectronic devices, each of the two optical fiber connectors are positioned within housing 41 until grasped relatively firmly by the latch arms of each latching means. Understandably, optical coupling has occurred at this time such that operation of system 10 can now occur.

Figure 4:
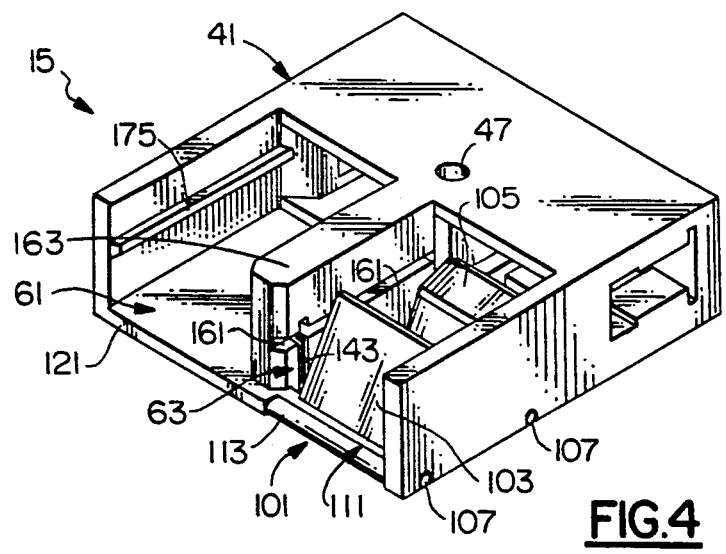
FIG. 4 is an enlarged perspective view of the device of FIG. 3, as fully assembled, and further indicating a different keying scheme for the keying means of the invention.

As shown in FIGS. 2-4, housing 41 of device 15 further includes shutter means 101 within one of the housing's chambers (e.g., 63). Shutter means 101 is designed for preventing the emission of optical light from assembly 11 through device 15 when the respective optical fiber connector is removed from chamber 63. Such protection is mandated by the aforementioned F.D.D.I. standards to prevent potential injury to an individual who may inadvertently look into the end of housing 43 for a prolonged period following such removal. To assure redundancy, shutter means 101 preferably includes a pair of movable shutters 103 and 105, spacedly positioned within the chamber and capable of being fully depressed to a substantially flat profile when engaged by the incoming housing of the respective optical fiber connector. That is, each shutter is movable downward (upward in FIG. 1) in a direction represented by the arrow "F" in FIG. 3. This occurs, as defined, until each shutter engages a respective surface which prohibits further movement. In a preferred embodiment, each shutter pivots about a central axes formed by an elongated shaft section 107 when the shutters are fully positioned within housing 41. Each shutter thus rotates about this axes during closure and when engaged by the respective connector.

As shown in FIGS. 2-4, shutter means 101 further comprises an elongated spring 111 which includes opposing end segments 113 and 115 which are designed for grasping respective parts of the upper wall 121 of housing 41. Slots are provided within this wall to facilitate such grasping by spring 111. Additionally, spring 111 includes a pair of projecting pads 123 each designed for having a respective one of the shutters positioned thereagainst. Thus, these springs serve to bias the shutters to the normally closed position depicted in FIGS. 3 and 4. During engagement by the respective connectors, the shutters act against the springs to cause depression thereof.

In accordance with the teachings herein, device 15 further includes keying means 133 (as best seen in FIG. 2) for being positioned within housing 41 in one of four different manners. This keying structure meets the aforementioned F.D.D.I. standard, which requires four different keying orientations in order to accommodate various, different arrangements for optical fiber connectors.

Figure 5:
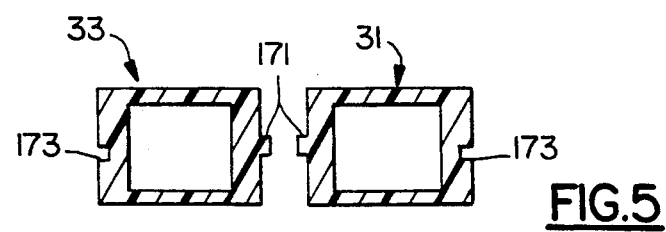
FIG. 5 is a partial end view, in section, of the optical connector shown in FIG. 1, as taken along the line 5—5 in FIG. 1.

Keying means 133, as best seen in FIG. 2, comprises a key member 135 having four projecting sides 137, 139, 141 and 143. As seen in FIG. 2, side 143 is of lesser height than the remaining three sides 137, 139 and 141. In the embodiment of FIG. 3, shown for illustration purposes only, keying means 133 is in position within a corresponding aperture 151 (FIG. 1) such that one of the larger sides (e.g., 141) serves to block an elongated slot 161 located within housing 41 and running alongside a respective one of the chambers (in this case, chamber 63). In a preferred embodiment, each chamber includes a respective one of these elongated slots therein, each located within opposing sides of the common, interim wall 163 of housing 41. Only one such slot is shown in FIGS. 2-4, for illustration purposes. In the embodiment of FIG. 3, therefor, the housing of a connector having internally projecting ribs (e . g., 171 in FIG. 5) would be prohibited from entry within chamber 63. To accommodate such a connector, the use of the shorter height projecting side 143, as shown in FIG. 4, would be necessary or, alternatively, the respective housing (e.g., to the right in FIG. 5) entering chamber 63 would not include a projecting tab (171, described below) thereon. It is understood that key member 135 may include other different length sides as part thereof in order to provide yet further keying capabilities, if desired, such that the particular configuration depicted herein is not meant to limit the invention. As shown in FIG. 5, as taken along the line 5—5 in FIG. 1, each of the incoming optical fiber connectors preferably includes a substantially rectangular shaped outer housing (partially shown in FIG. 5) with the preferred, male projecting tabs 171 extending therefrom along the internal surfaces thereof. Further, each optical fiber connector housing preferably includes elongated slots 173 within the outer surfaces thereof so as to accommodate a respective rib 175 (one shown in FIGS. 2-4). Thus, housing 41 includes ribs for slidably engaging and being positioned within slots of the respective incoming optical fiber connector housings, while also including a pair of elongated slots therein for accommodating respective, male projecting tabs of such housings. This orientation is not meant to limit the invention, however, in that other combinations are readily possible. For example, it is possible to provide opposing pairs of slots within each chamber to receive respective pairs of projecting tabs located on each opposing side of a respective connector. Alternatively, it is possible to use pairs of projecting ribs within each chamber to accommodate respective pairs of slots within each connector. As understood, however, the keying means of the present invention is ideally suited for use with at least one common wall (163) having a pair of adjacent elongated slots (e.g., 161) therein with the aperture (151) of the housing located within such a common, interim wall so as to expose the respective sides (137, 139, 141, and 143) to the designated elongated slots for either blocking or permitting passage into the housing's chambers.

In a preferred embodiment of the invention, housing 41 is comprised of plastic material (e.g., polycarbonate), while each of the latching means were also comprised of plastic (e.g., nylon). Additionally, the invention's keying means 133 was also preferably comprised of polycarbonate, while each of the described shutter members may be either polycarbonate or metal and the retention springs are preferably stainless steel. These materials are not meant to limit the invention, however, as others are readily acceptable.

Thus there has been shown and described an optoelectronic system which provides for precise alignment between an optoelectronic assembly which forms part of the system and an optic means (e.g., a duplex connector as shown in 5,005,939, or a movably retained pair of individual optical connectors as fully defined in Ser. No. 07/874,162) now allowed. Such a system further uniquely includes the described optical fiber coupling device which, as stated, possesses the unique ability to initially capture the protruding ends of the optoelectronic devices of the system's optoelectronic assembly and thereafter receive the incoming optical fiber connectors therein. Due to the significant capabilities of the present invention, these incoming optical fiber connectors may be relatively movable. The invention is thus particularly adapted for overcoming many of the difficulties associated with tolerance controls or the like during manufacturing processes. Additionally, the present invention as defined is of relatively simple construction, thus assuring a cost effective end product for the consumer.

While there have been shown and described what are at present considered the preferred embodiments of the invention, it will be obvious to those skilled in the art that various changes and modifications may be made therein without departing from the scope of the invention as defined by the appended claims.

What is claimed is:

1. An optical fiber coupling device for coupling optic means and at least one optoelectronic device of an optoelectronic assembly, said coupling device comprising:
a housing adapted for being located adjacent said optoelectronic assembly relative to said optoelectronic device, said housing defining at least one chamber therein adapted for having said optic means positioned therein; and
latching means movably positioned within said housing relative to said chamber, said latching means adapted for initially engaging said optoelectronic device to thereby assume a relatively fixed position within said housing, said latching means thereafter adapted for engaging said optic means to retain said optic means within said chamber in optical alignment with said optoelectronic device.

2. The coupling device of claim 1 further including means for securing said housing to a printed circuit board such that said housing will be located adjacent said optoelectronic assembly, said means for securing comprising at least one retention screw adapted for passing through said printed circuit board to engage said housing.

3. The coupling device of claim 2 wherein said housing includes a hole therein, said retention screw projecting within said hole.

4. The coupling device of claim 1 wherein said latching means includes a pair of protruding latch arms, each of said arms adapted for latching onto a respective side of said optic means to provide said retention thereof within said chamber.

5. The coupling device of claim 4 wherein said latching means includes a base portion and said housing includes a slot therein, said base portion movably positioned within said slot.

6. The coupling device of claim 5 wherein said base portion of said latching means includes an opening therein, said opening adapted for receiving an end of said optoelectronic device therein during said engaging of said device by said latching means.

7. The coupling device of claim 1 further including keying means positioned within said housing adjacent said chamber for allowing said optic means to be positioned within said chamber and for preventing other optic means from being so positioned.

8. The coupling device of claim 7 wherein said keying means comprises a key member and said housing includes an aperture therein, said key member being positioned within said aperture.

9. The coupling device of claim 1 further including shutter means within said chamber for blocking the optical output from said optoelectronic device from passing from said coupling device when said optic means is not positioned within said chamber.

10. The coupling device of claim 9 wherein said shutter means comprises a spring for being positioned within or secured to said housing and at least one movable shutter member, said spring biasing said shutter member to a position whereby said shutter member will block said optical output from said optoelectronic device.

11. An optoelectronic system for use in an information handling system, said optoelectronic system comprising:
an optoelectronic assembly for receiving and/or transmitting optical data signals;
optic means for being optically coupled to said optoelectronic assembly for having said optical data signals pass therethrough; and
an optical fiber coupling device for coupling said optic means and at least one optoelectronic device of said optoelectronic assembly, said coupling device including a housing adapted for being located adjacent said optoelectronic assembly relative to said optoelectronic device, said housing defining at least one chamber therein adapted for having said optic means positioned therein, and latching means movably positioned within said housing relative to said chamber, said latching means adapted for initially engaging said optoelectronic device to thereby assume a relatively fixed position within said housing, said latching means thereafter adapted for engaging said optic means to retain said optic means within said chamber in optical alignment with said optoelectronic device.

12. The optoelectronic system of claim 11 wherein said optoelectronic assembly includes a pair of said optoelectronic devices spacedly positioned therein.

13. The optoelectronic system of claim 12 wherein a first of said optoelectronic devices is adapted for receiving electrical data signals and for converting said received electrical data signals to optical data signals.

14. The optoelectronic system of claim 13 wherein a second of said optoelectronic devices is adapted for receiving optical data signals and for converting said received optical data signals to electrical data signals.

15. The optoelectronic system of claim 11 further including an electrical circuit member, said optoelectronic assembly being electrically coupled to said electrical circuit member.

16. The optoelectronic system of claim 11 wherein said optic means comprises a duplex optical connector.

17. The optoelectronic system of claim 11 wherein said optic means comprises a pair of optical connectors.

18. The optoelectronic system of claim 11 further including means for securing said housing to a printed circuit board such that said housing will be located adjacent said optoelectronic assembly, said means for securing comprising at least one retention screw adapted for passing through said printed circuit board to engage said housing.

19. The optoelectronic system of claim 18 wherein said housing includes a hole therein, said retention screw projecting within said hole.

20. The optoelectronic system of claim 11 wherein said latching means includes a pair of protruding latch arms, each of said arms adapted for latching onto a respective side of said optic means to provide said retention thereof within said chamber.

21. The optoelectronic system of claim 20 wherein said latching means includes a base portion and said housing includes a slot therein, said base portion movably positioned within said slot.

22. The optoelectronic system of claim 11 further including keying means positioned within said housing adjacent said chamber for allowing said optic means to be positioned within said chamber and for preventing other optic means from being so positioned.

23. The optoelectronic system of claim 22 wherein said keying means comprises a key member and said housing includes an aperture therein, said key member being positioned within said aperture.

24. The optoelectronic system of claim 11 further including shutter means within said chamber for blocking the optical output from said optoelectronic device from passing from said coupling device when said optic means is not positioned within said chamber.

25. The optoelectronic system of claim 24 wherein said shutter means comprises a spring for being positioned within or secured to said housing and at least one movable shutter member, said spring biasing said shutter member to a position whereby said shutter member will block said optical output from said optoelectronic device.

* * * * *